United States Patent
Kuntzsch et al.

[11] Patent Number: 6,161,202
[45] Date of Patent: Dec. 12, 2000

[54] METHOD FOR THE MONITORING OF INTEGRATED CIRCUITS

[75] Inventors: Claus Kuntzsch, Erisngen; Frank Mayer, Uttenreuth, both of Germany

[73] Assignee: EE-Signals GmbH & Co. KG, Alfeld, Germany

[21] Appl. No.: 09/025,193

[22] Filed: Feb. 18, 1998

[30] Foreign Application Priority Data

Feb. 18, 1997 [DE] Germany .......................... 197 06 321

[51] Int. Cl.[7] ................................................. G06F 11/00
[52] U.S. Cl. ................................................. 714/51; 714/25
[58] Field of Search ................................ 714/51, 2, 3, 6, 714/7–9, 11, 25–30, 31, 39, 43, 48, 41, 47, 707, 733, 736; 395/500.05, 575, 500.5

[56] References Cited

U.S. PATENT DOCUMENTS

| | | | |
|---|---|---|---|
| 3,876,987 | 4/1975 | Dalton et al. | 340/172.5 |
| 4,727,545 | 2/1988 | Glackemeyer et al. | 371/23 |
| 4,849,979 | 7/1989 | Maccianti et al. | 371/68 |
| 4,967,347 | 10/1990 | Smith et al. | 364/200 |
| 5,117,442 | 5/1992 | Hall | 375/107 |
| 5,132,685 | 7/1992 | Dewitt et al. | 341/120 |
| 5,200,963 | 4/1993 | Chau et al. | 371/68.1 |
| 5,276,823 | 1/1994 | Cutts, Jr. et al. | 395/575 |
| 5,452,443 | 9/1995 | Oyamada et al. | 395/182.08 |
| 5,550,736 | 8/1996 | Hay et al. | 364/424.03 |
| 5,588,111 | 12/1996 | Cutts, Jr. et al. | 395/182.07 |
| 5,588,720 | 12/1996 | Mattern | 303/122.08 |
| 5,838,899 | 11/1998 | Leavitt et al. | 395/185.09 |
| 5,838,900 | 11/1998 | Horvath et al. | 395/185.09 |
| 5,956,474 | 9/1999 | Bissett et al. | 395/182.09 |

*Primary Examiner*—Nadeem Iqbal
*Attorney, Agent, or Firm*—Scully, Scott Murphy & Presser

[57] ABSTRACT

There is proposed a process for the monitoring of integrated circuits (ASICs 21, 22) in safety-critical applications, in which the ASICs (21, 22) with identical constructions are connected in parallel and simultaneously to all inputs. The ASICs (21, 22) operate closely synchronized with each other and mutually monitor each other. They carry out a comparison of interim results, end results and output data. The logic condition is monitored at different monitoring points; namely, the freely defineable interim and end results of an information processing, the suitable internal switching conditions and the internal signals at discrete scanning points in time.

12 Claims, 2 Drawing Sheets

METHOD FOR THE MONITORING OF INTEGRATED CIRCUITS

The present invention relates to a method for the monitoring of integrated circuits, especially for integrated circuits which are employed in safety-critical applications, pursuant to the preamble of a process for the monitoring of application specific integrated circuits (ASICs), especially of application specific integrated circuits in safety-critical applications.

Electrical and electronic control circuits are frequently employed for the control, regulating and monitoring of technical processes. Thus, there are present a multiplicity of applications, in which the risk originating from a technical process or system lies considerably above that of the generally acceptable limiting risk in response to a breakdown or upon errors encountered within such a control circuit. Here, there can be named as a typical example in the employment of systems, or respectively, complex process procedures in such areas, in which there is present the endangering of humans or property; for instance, in the area of operating plants, in agriculture and forestry economy, in mining, in the processing, travel or in the medical technology. In these areas, there are demanded operating processes which in principle take place without any errors, and electrical and electronic control circuits which function without error.

The latently present potential of endangerment, in the described instances, must be reduced to an acceptable measure, which among others, occurs also through technological measures and precautions taken in the employed control circuits. In particular, it is required to provide mechanisms for the recognition of errors and for the avoidance of errors, as well as for the self monitoring and alternating monitoring within the employed control circuits (hardware) and programs (software).

In the inclusive norms; for example, DIN V VDE 0801, IEC 65A OR ICE 1308, for the above-mentioned safety-critical applications of electrical, electronic and programmable electronic systems, there are disclosed single or multi-channel, diverse and/or redundant circuit structures, by means of which there is rendered possible the required recognition and avoidance of errors within a circuit. A recognition of encountered errors is possible in accordance with these norms; for example, through a multiple comparison of the results in identically constructed circuit components. In a similar manner, errors which are encountered in circuits can; however, also be tolerated through a majority-decision; for example, a "2 out of 3 selection".

In the state-of-the-technology as is known in practice, as a rule, controls are presently implemented for safety-critical applications through the employment of programmable processing units, such as microcontrollers or microcomputers. As a result, there is obtained a typical arrangement in the parallel circuit of two such independent (computer) units. Both units process identical input data and are synchronized in such a manner, that the operations which are carried out on these data take place quasi-simultaneously. Thereby, this renders possible a mutual comparison of interim results and output magnitudes. Concurrently, there can thereby also be indirectly monitored the identical program sequence in the two (computer) units. The output magnitudes which are delivered from the independent units are then interlinked in a further circuit block in such a manner, that upon encountered and determined discrepancies between the delivered data, there is automatically assumed, and respectively maintained, a secure condition of the technological process.

The above-mentioned described known microcontrollers, or respectively, microcomputers; however, evidence a series of disadvantages in contrast with the employment of ASICs (Application Specific Integrated Circuits) in safety-critical applications.

A usual microcontroller, due to the testwise processing of command sequences and the special evaluation of the results, can be tested only indirectly and incompletely.

In contrast therewith, a structure test is not possible.

Furthermore, the error recognition and the error treatment; namely in software implemented sampling routines and plausability tests, sets ahead the undisrupted basic functions of the microcontroller or, respectively, microcomputer, which is not applicable in every instance.

Moreover, the stepwise program processing through a microcomputer does not allow for any parallel processing of information. As a result thereof, critical process conditions cannot thereby be immediately recognized. The comparison in a multi-channel structure can only be implemented in an exchange with the processing, which leads, however, to an increase in the period of time for the discovering of the errors.

In the utilization of ASICs there are thus obtained basic advantages. However, also in this instance, does the current state-of-the-technology evidence disadvantages. The comparison in a multi-channel structure is namely concerned only with the output data (for example, multiple decisions), and there does not take place any comparison of internal conditions. This prevents the uncovering of hidden errors which (initially) do not make themselves noticeable at the outputs.

The utilization of application—specific integrated circuits (ASICs) in safety-critical systems is already counted in the current state-of-the technology. Inasmuch as the behavior and the functionality of an ASIC is determined during development and production, subsequent modifications in this functionality and in contrast with a solution which is based on software is; however, not possible. This accordingly restricts the flexibility, and however, concurrently prevents a series of error situations which can be encountered through inappropriate servicing or through tampering of the user with the software.

From W. Glauert: "Ultra-Large Scale Integration of a Control Unit for Safety-Critical Systems" Reutlingen 1994, (Final Report of the Research Project 01 M 2882 A/6 Jessi AE 11 Project), investigations have become known, by means of which there are tracked the goal to so change the reliability, as well as the effects of errors in single-channel ASIC structure, that a utilization of only one of that kind of correlated ASIC becomes possible without requiring any further peripheral or structural measures in safety-critical applications.

From "Formal Verification and Synthesis of On-Line SelfTest" by R. Tully A. Hunter, R. Zimmer and others, there are also already known structures which are formed from identical ASICs with at least three channels and multiple-decision elements. These structures are employed particularly when, in addition to safety, there is also demanded high degree of availability of the overall system.

Commencing from the above-mentioned state-of-the-technology, it is an object of the present invention to develop a process for the monitoring of integrated circuits of the above-mentioned type, which allows for the dependable monitoring of ASICs in an at least two-channel structure, with a low technical demand. Inventively, this object is solved in that at least two application specific integrated circuits of identical construction are connected in parallel and simultaneously to all inputs, the at least two ASICs operate in close synchronism with each other, and wherein the two-channel structure which is formed from the at least two ASICs implements a comparison of interim results, end results and output data, and the logic condition of the at least two ASICs is monitored at different monitoring points. Advantageous modifications and embodiments are described in the dependent claims.

Two-or multi-channel structures of ASICs, and especially an efficient and minimal-costly process for the comparison of end results or interim results and output data, which are required in such a structure, are not known from the described state-of-the-technology. The inventive process allows for the monitoring of ASICs in a preferably two-channel structure, whereby there can be monitored the logic condition at different monitoring points. Such monitoring points can be; for example: the interim and end results of the information processing, internal switching conditions and internal signals at discrete scanning time points.

The process which is employed for the comparison of the conditions at the monitoring point can be implemented with minor technical demands, and enables the comparison of a large number of monitoring points for each unit of time.

Moreover, ASICs allow for a high quality, parallel processing of information. As a result, critical practice conditions can be recognized much more rapidly than is the instance in the employment of microcontrollers. Furthermore, the comparison can be implemented in a multi-channel structure concurrently side-by-side with the actual processing, which leads to shorter periods for the discovering of errors. Finally, the operation of the system cannot be disturbed by the monitoring.

In addition to these basic advantages in the utilization of ASICs, through the inventive paired monitoring of the ASICs there can be achieved the still further advantages in that there becomes possible a simple realization of preferably two-channel structures and a comparison of the logic conditions at a large number of monitoring points. Moreover, there is also obtained the higher probability of the recognition of errors, inclusive of the recognition of hidden errors, which leads to a shorter period of time for the discovery of the errors.

In a practical application of the inventive solution, it has been found as being advantageous, that the ASIC can carry out the monitoring of almost all internal connections and circuit structures and, consequently facilitates a substantially higher degree of uncovering of errors than would be possible with microcontrollers and microcomputers. Thereby, the inventive process is also suitable for self-tests and structure-tests in safety-critical applications.

In the drawings, there is illustrated an example of the invention, wherein.

Figure 1:
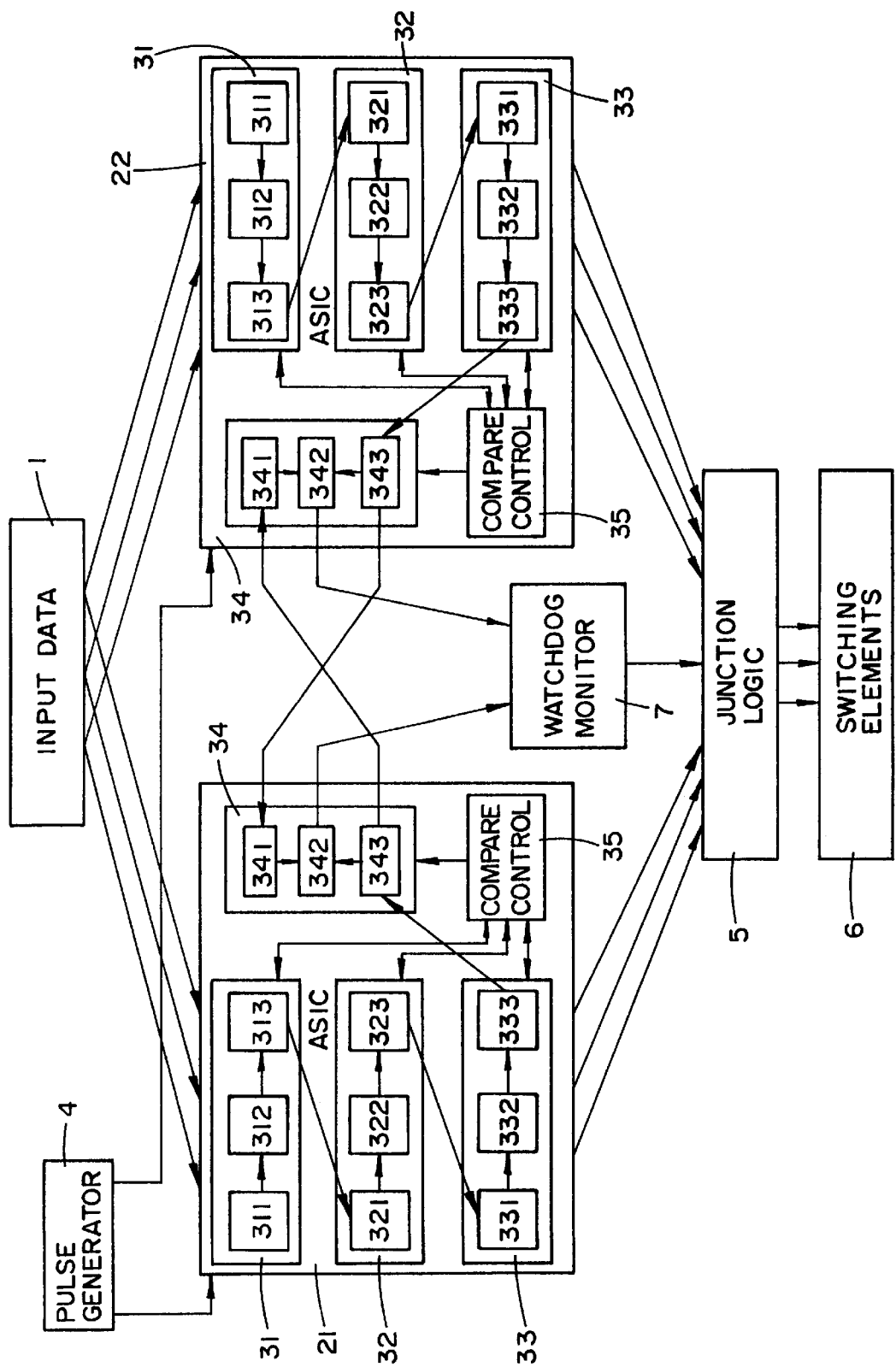
FIG. 1 illustrates the process for the monitoring of integrated circuits shown in a block circuit diagram.

In the block circuit diagram pursuant to FIG. 1, there are illustrated two integrated circuits 21, 22 (ASICs) in parallel adjacent each other, and with identical constructions. Instead of the two illustrated integrated circuits 21, 22, it is also possible to provide a plurality of such identical integrated circuits. The principal consideration does not change as a result thereof.

The input data 1 from the technical process which is to be monitored lie in parallel and concurrently at the two ASICs 21, 22. The two ASICs 21, 22 operate in close synchronism. Moreover, short-term deviations in the input data are permissible, which; for example, can be produced through asynchronous signals, which are first synchronized with each other in the ASIC.

As disclosed in FIG. 1 and described in further detail hereinbelow, there is also provided a monitoring of the ASICs 21, 22 in a herein two-channel structure with a comparison. The two ASICs 21 and 22 monitor each other mutually.

The two ASICs 21, 22 each respectively possess a unit 31 for the preprocessing and preparation of the input parameters. For this purpose, integrated in each of the two ASICs 21, 22 is a processing unit 32 and an output unit 33. Furthermore, each of the ASICs 21, 22 also possesses a comparator unit 31 and a unit 35 for the control and release of the comparison.

In the unit 31 for the preprocessing and preparation of the input parameters there are provided a series of status storages 311, 312, 313 with safety-relevant input parameters. These status storages 311, 312, 313, in turn, are again arranged in series with the status storages 321, 322, 323 of the processing unit 32 with the safety-relevant interim results. Finally, the status storages 321, 322, 323, in turn, are arranged in series with the further status storages 331, 332, 333 of the output unit 333 with the safety-relevant output parameters and end results. Concurrently, the units 31, 32, 33 stand in an alternating connection with the unit 35 for the control and release of the comparison.

Connected in series with the units 31, 32, 33 is the comparator unit 34, which represents an input cell 341 with the actual condition from the second ASIC, a comparator 342 for the determination of the identity of the input cell 341 and the condition or status storage 343, and finally the condition or status storage 343 which represents an actual element for comparison. The outputs and the inputs of the comparator unit 34 of the two ASICs 21, 22 are presently interconnected in a crossover juncture, so that the input cells 341 of the first ASIC 21 (22) are connected with the status storage 343 of the second ASIC 22 (21) and conversely. The comparator 342 of the two ASICs 21, 22 for the determination of the identity of input cell 341 and the status storage 343 are connected to the circuit block 7 for the monitoring of the comparator 342 for error recognition, watchdog and emergency shutdown. This circuit block 7 which is located outside of the ASICs 21, 22 ensures, as a watchdog, that within a specified time interval there takes place at least one comparison.

An error signal which is delivered in the instance of an error from the comparator units 342, similarly causes by means of the circuit block 7 which is located outside of the ASICs 21, 22, a transition into the secure condition. Concurrently, this secure or safe condition is also assumed at the outputs of the ASICs 21, 22 in the event that this is still possible notwithstanding the internal error.

Designated by reference numeral 4 in FIG. 1 is a pulse generator, whereas furthermore a junction logic 5 for the together guidance of the two channels (ASICs 21, 22) and actors 6, or respectively, the active switching active circuit elements, are installed at the output of the ASICs 21, 22.

Figure 2:
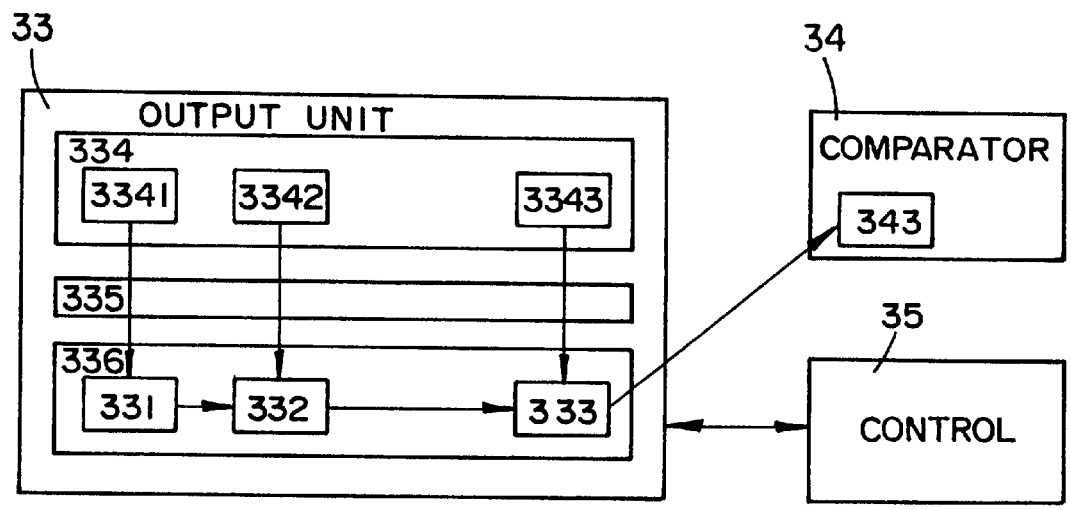
FIG. 2 illustrates the function block pursuant to the block circuit diagram of FIG. 1, shown in a detailed representation.

The assembly and the functioning of the implemented comparison can be ascertained in detail from FIG. 2 as an example of the output unit. The FIG. 2 is correspondingly applicable to the input unit 31 and the processing unit 32. The logic conditions of the monitoring points in the individual functional blocks 31, 32, 33 of the ASICs 21, 22 are scanned at discrete points in time, and retained in the above-described status storages 311, 312, 313; 321, 322,

323; 331, 332, 333. Such status or condition storages can consist, for example; of flip-flops. The status storages, as previously described, are connected to a slide register. The output unit 33 consists of the circuit block 334 with corresponding monitoring points 3341, 3342, 3343, the circuit block 335 for implementing the scanning sequence, and the circuit block 336 with status storages for the scanned information. In addition thereto, there is also implemented the scanning sequence by means of the circuit block 335 which communicates with the circuit block 35.

The content of the status storages can be conveyed independently of the further information processing in the ASICs 21, 22 through the slide register chain to the input of the comparator (input cell 343). The comparison takes place serially bit-wise through a junction logic (comparator 342). The information which is delivered by the second ASICs 22 (21) from the status storage 341 is thereby compared with respect to identity with the information inherent in the input cell 343. When, in this instance, there is determined the presence of deviations, this then leads to a breaking-off of the comparison and to a report of a disruption through the circuit block 7. In case of coincidence, the comparison is carried out in the following pulse with the next element from the slide register chain.

In order to be able to tolerate the allowed short-term deviations in the data and the therefrom resulting short term deviations of interim results, the scanning sequence or the comparison can be delayed through the intermediary of a signal from the unit 31, the processing unit 32 or the output 33 at the control 35, and the release of the comparison of individual processing units 31, 32, 33. This delay continues for so long until the read input information has stabilized out of the sight of this processing unit 31, 32, 33. There are always allowed only short delays of the alternatingly effected monitoring. When a comparison does not occur within a predetermined period of time, this then results in a report of a activated triggered by the watchdog 7.

The output data which are present to the outputs of the ASICs 21, 22 are utilized for the actuation of actors 7, or respectively active switching elements. For this purpose, there is required a further circuit block 5 which is located either within or outside of the ASICs 21, 22 for the joining together of the two channels (ASICs 21, 22).

In a practical exemplary embodiment, the inventive two-channel structure is implemented in an early-warning system in railroad operation, which serves as a safety-critical application. The two ASICs 21, 22 mutually monitor themselves, as has been already described hereinabove. Through the specific construction of the circuit block 5, in which the outputs of the first ASIC 21 are read back through the second ASIC 22, and then tested in contrast with the internal information, there is additionally achieved a monitoring of the outputs and the pin region. In this specialized application, the second ASIC module is not contemplated as a redundant system for an increase in the availability. Namely, there is merely produced a redundancy with regard to the switching of warning-display installations of the mentioned early-warning system. The ASICs 21 and 22, in this application, are employed as a primary or main module (ASIC 21) and control module (ASIC 22). The configuration as a main module and as a control module is implemented through a configurations pin. The ascertaining of an error in one of the two modules (ASIC 21, 22) leads, as a rule, to a switching into the safe condition.

The ASIC 22, as a control module, has compared the output data of the further ASIC 21, as a main module, with its own output data. In this manner, there are also compared all transmitted seriallized reports.

The pin region, as is known, represents a point of concentration for failures in integrated circuits. Only through the inventive two-channel solution with the specialized implementation of the junction logic 5 can the pins be monitored. As a result thereof, any damages of the pin electronics, and also contact losses in the system or main circuit board, can be recognized in an early warning installation.

The monitoring during continuous operation is carried out through a cyclical comparison of the internal values of the ASICs 21, 22 (main module and control module). For this purpose, the signal values which are to be compared are copied in so-called shadow or parallel registers, which correspond to the status storages in the slide registers 311, 312, 313; 321, 322, 323; 321, 322, 333. The contents of the parallel registers are then serially transmitted to the presently other ASIC 21, 22 and there compared with local values. Any kinds of deviations with regard to the compared values lead immediately to the triggering of a system disruption.

Figure 3:
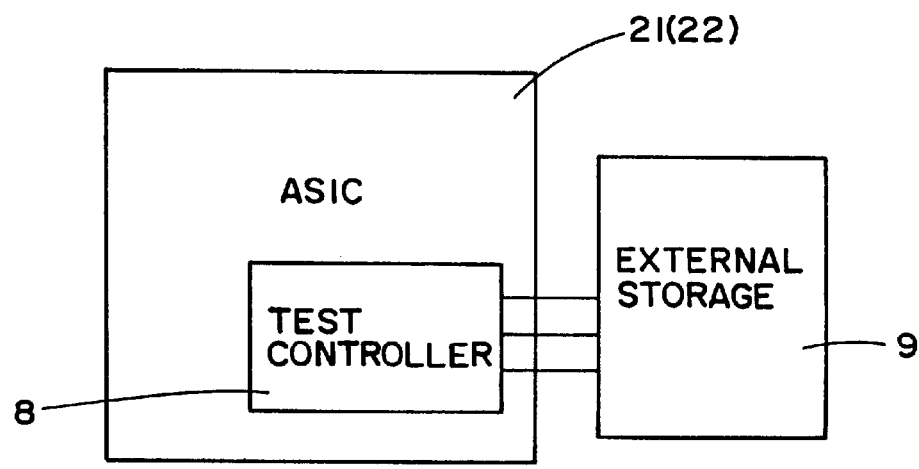
FIG. 3 illustrates a block circuit diagram of a test-controller which is integrated into an ASIC.

In FIG. 3 there is schematically represented, by means of a block circuit diagram, the integration of a test controller 8 into an integrated circuit (ASIC) 21, 22.

By way of example, inasmuch as it is usually adequate, the test control 8 is integrated into only one of the ASICs 21, 22, although the integration is basically also possible in each of the two ASICs 21, 22. The implementation of a test controller 8 is technologically sensible when a high degree of safety tasks must be fulfilled, as is, for example, the case with the already previously-mentioned early-warning systems. The test controller 8 bases its criteria from an external storage 9, in essence, upon a foreign module. Concerning these criteria there are understood the internal values of the module, for example its physical properties. For this purpose, the outputs of the test controller 8 for addresses, data and controls are conducted to the so-called test-pattern storage 9 located outside of the test controller 8.

The test controller 8 reads out the content of the test-pattern controller 9, and the controls the (actuating-) self-test of the ASICs 21, 22, the cyclical comparison of the internal values of the module (physical properties) during the operation, as well as the system pulse and the scanning pulse of the program.

The (actuation) self-test of the ASICs 21, 22 is an essential function, above all, in a safety-critical application, and usually signifies that the test controller in the ASIC tests its own ASIC. In contrast therewith, there is nevertheless proposed to further develop the basic concept in such a manner, that there is carried out an external test of the one of the ASIC's 21 (22) by means of the test controller 8 of the other ASIC's 22 (21). In this manner, the tested ASIC 21 (22) can be completely tested with regard to the errors which are covered by the test vectors. The self-test takes place in two alternating phases.

After the acceleration, the test controller 8 controls the cyclical comparison between the ASICs 21, 22. After completion of the self-test, the control is then transferred to a configuration block. When the latter reports the completion of the system-configuration and of the self-test, there is then started the cyclical comparison of the internal values of the two ASICs 21, 22. The system is now in operational readiness.

The constant monitoring of the ASICs 21, 22 as the main and control modules, which is required in addition to the self-test and a module testing, is effected in the manner of the described inventive process.

In the preceding description there has been represented the process only in the application for the monitoring of integrated circuits, the so-called ASICs (21, 22). Within the context of the invention it is, however, also possible to employ the process for the monitoring of the microcontrollers. This signifies that this process with the inventive features pursuant to claims 1 through 12 is also applicable to chips which carry out any kind of processes. As can be read out in claim 1, with this application there is generally sought the goal that at least two microcontrollers with identical constructions are connected in parallel and simultaneously with all inputs, whereby the microcontrollers operate in close synchronism with each other. The two-channel structure, which is formed by the microcontrollers, carries out a comparison of interim results, end results and output data. The logic condition of the at least two microcontrollers is monitored at different monitoring points.

In general, through this invention there are described two-channel systems which are utilizable for integrated circuits and for microcontrollers. Thereby, presently described are two mechanism which, through the utilization of the multiple redundant process, are realizable in a safety-critical system in order to increase the reliability thereof.

What is claimed is:

1. A process for monitoring of application specific integrated circuits (ASICs), especially of application specific integrated circuits in safety-critical applications, characterized in that at least two application specific integrated circuits (ASICs 21, 22) of identical construction are connected in parallel and simultaneously to all inputs, said at least two ASICs (21, 22) operate in close synchronism with each other, and wherein the two-channel structure which is formed from said at least two ASICs (21, 22) implements a comparison of interim results, end results and output data, and wherein the logic condition of said at least two ASICs (21, 22) is monitored at different monitoring points, and wherein each of the ASICs (21, 22) is provided with an input unit (31) for preprocessing and preparation of input data, a processing unit (32), an output unit (33) and a comparator unit (34), status storages (311, 312, 313; 321, 322, 323; 331, 332, 333) which are connected in series with tapped-off status information from the units (31, 32, 33, 34), wherein the input unit (31), the processing unit (32) and the output unit (33) are each respectively in an alternating relationship with a unit (35) for control and release of the comparison, and wherein the outputs and the inputs of each comparator unit (34) which is integrated in each of said ASICs (21, 22) are in a cross-over connection with each other, such that an input cell (341) of the first comparator unit (34) is connected with a status storage (343) of the second comparator unit (34), and conversely an input cell (341) of the second comparator unit (34) is connected with a status storage (343) of the first comparator unit (34), and a comparator (342) in each comparator unit (34) is presently switched to a circuit block (7) for monitoring of error recognition, watchdog and emergency switch-off.

2. A process for the monitoring of application specific integrated circuits (ASICs), especially of application specific integrated circuits in safety-critical applications, characterized in that at least two application specific integrated circuits (ASICs 21, 22) of identical construction are connected in parallel and simultaneously to all inputs, said at least two ASICs (21, 22) operate in close synchronism with each other, and wherein the two-channel structure which is formed from said at least two ASICs (21, 22) implements a comparison of interim results, end results and output data, and, wherein the logic condition of said at least two ASICs (21, 22) is monitored at different monitoring points and each of the at least two ASICs (21, 22) includes an output unit (33) constituted of a circuit block (334) with installed monitoring points, a circuit block (335) for the implementation of a scanning sequence, and a circuit block (33) with status storages for the scanned information, and wherein the content of the status storages are conveyed independently of further information processing through the slide register chain formed by the status storages to the input of the comparator unit (34).

3. A process according to claim 1 or 2, characterized in that the different monitoring points monitor interim results and end results of information processing, internal switching conditions in the ASICs (21, 22), and/or internal signals in the ASICs (21, 22) at discrete scanning points in time.

4. A process according to claim 3, characterized in that the interim and end result are freely defineable.

5. A process according to claim 1 or 2, characterized in that in at least one of said ASICs (21, 22) there is integrated a preferably independent test controller (8) which controls the self-test of of said ASICs (21, 22), and the cyclical comparison of internal values of the modules in combination with an external storage (9).

6. A process according to one of claims 1 or 2, characterized that the input data (1) are applied in parallel and simultaneously to the ASICs (21, 22), and wherein the ASICs outputs of the (21, 22) are connected to the circuit block (7) as well as to a junction logic (5) for the at least two-channels which, in turn, have outputs connected with active switching elements (6), whereby the junction logic (5) is implemented such that the output of the one module are read back and tested by the other module.

7. A process according to one of claim 1 or 2, characterized in that the logic conditions of the monitoring points in the individual function blocks are at discrete points in time, and retained in the status storages (311, 312, 313; 321, 322, 323; 331, 332, 333) of the unit (31), the processing unit (32).

8. A process according to one of claim 1 or 2, characterized in that the status storages (311, 312, 313; 321, 322, 323; 331, 332, 333) are connected with a slide register.

9. A process according to claim 1 or 2, characterized in that the input unit (31) and the processing unit (32) are constructed analogously to the output unit (33).

10. A process according to one of claim 1 or 2, characterized in that the ASICs (21, 22) implement a cyclical comparison of the internal observation points.

11. A process according to one of claim 1 or 2, characterized in that there is provided at least one internal timer which, subsequent to a time interval defined from externally thereof enforce an intermittent operation and thereby a cyclically switched-on self-test.

12. A process according to one of claim 1 or 2, characterized in that through the signal technology safely designed watchdog-circuit in the circuit block (7) there is controlled the synchronization of the ASICs (21, 22), and in the instance of a determined deviation from the synchronization there is triggered an alarm and the entire system is conducted into the safe condition.

* * * * *